United States Patent
Kawabe et al.

(10) Patent No.: US 8,611,037 B2
(45) Date of Patent: Dec. 17, 2013

(54) MAGNETIC DISK DRIVE AND METHOD FOR SERVO BURST DATA CORRECTION

(75) Inventors: Takayuki Kawabe, Sagamihara (JP); Makoto Asakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 21 days.

(21) Appl. No.: 13/480,751

(22) Filed: May 25, 2012

(65) Prior Publication Data

US 2013/0182350 A1     Jul. 18, 2013

(30) Foreign Application Priority Data

Jan. 13, 2012    (JP) .................. 2012-005060

(51) Int. Cl.
*G11B 5/596*    (2006.01)
*G11B 5/09*    (2006.01)

(52) U.S. Cl.
USPC ........................................ 360/77.04; 360/51

(58) Field of Classification Search
None
See application file for complete search history.

(56) References Cited

U.S. PATENT DOCUMENTS

| | | | | |
|---|---|---|---|---|
| 7,315,430 B2 * | 1/2008 | Kisaka | ...... | 360/77.04 |
| 7,453,664 B2 * | 11/2008 | Kawabe | ...... | 360/77.08 |
| 7,719,788 B2 * | 5/2010 | Tomita | ...... | 360/77.07 |

FOREIGN PATENT DOCUMENTS

| | | |
|---|---|---|
| JP | 2006-031847 | 2/2006 |
| JP | 2006-031896 | 2/2006 |
| JP | 2007-080388 | 3/2007 |

* cited by examiner

*Primary Examiner* — Andrew L Sniezek
(74) *Attorney, Agent, or Firm* — Patterson & Sheridan LLP (57) ABSTRACT

According to one embodiment, a magnetic disk includes a plurality of tracks each having a plurality of servo frames with servo burst data and repeatable runout correction data written thereto. The repeatable runout correction data includes a pattern repeated at a predetermined period and is written so that beginning of write is delayed by a time corresponding to a correction amount with respect to a base point corresponding to a synchronization timing position in the servo frame. A detector detects a phase delay amount corresponding to a time elapsed until the repeated pattern is read from the servo frame by a magnetic head, with respect to the synchronization timing position.

12 Claims, 8 Drawing Sheets

MAGNETIC DISK DRIVE AND METHOD FOR SERVO BURST DATA CORRECTION

CROSS-REFERENCE TO RELATED APPLICATIONS

This application is based upon and claims the benefit of priority from prior Japanese Patent Application No. 2012-005060, filed Jan. 13, 2012, the entire contents of which are incorporated herein by reference.

FIELD

Embodiments described herein relate generally to a magnetic disk drive and a method for servo burst data correction in which servo burst data is corrected based on repeatable runout correction data.

BACKGROUND

In a magnetic disk drive, a head needs to be positioned at a target position on a disk (magnetic disk). Servo data (more specifically, servo burst data included in the servo data) is used for head positioning. The servo data is pre-written to servo areas discretely arranged at predetermined intervals in tracks (servo tracks) concentrically arranged on the disk. The servo areas with the servo data written thereto are referred to as servo frames.

To allow the head to be accurately positioned at the target position based on the servo burst data in the servo data, the center line of each of the tracks with the servo data written thereto is desirably shaped like a perfect circle. However, the shape of center line of each track on the disk is distorted and generally deviates from a perfect circle. This is mostly due to runout of a rotating shaft of a spindle motor that rotates the disk during servo data write (that is, the runout synchronizes with the rotation of the disk). If the shape of the center line of the track is distorted, the servo burst data involves errors resulting from the distortion, that is, errors resulting from the runout synchronizing with the rotation of the disk (what is called repeatable runout).

Thus, in recent magnetic disk drives, repeatable runout correction data is written to each servo frame. The repeatable runout correction data is digital data generated by encoding a correction amount required to correct (eliminate) an error caused by repeatable runout of the servo burst data (more specifically, the servo burst data read by the head and demodulated).

The demodulated servo burst data (that is, a demodulated value for the servo burst data) is corrected based on the correction amount indicated by the corresponding runout correction data. The correction eliminates the error caused by the repeatable runout from the demodulated value of the corrected servo burst data. Thus, the displacement of the head caused by the repeatable runout can be prevented by positioning the head at the target position based on the demodulated value of the corrected servo burst data. That is, the displacement of the head caused by the repeatable runout can be prevented by positioning the head based on the correction amount indicated by the repeatable runout correction data.

In the recent magnetic disk drives, the track pitch has been increasingly reduced in order to further improve recording density. It is assumed that an error occurs in such a magnetic disk drive when an attempt is made to position the head at the target position on the disk. In this case, even if the head (more specifically, a read element of the head) is slightly displaced from the target position of the target track (for example, the center line of the target track), the head approaches the boundary between the target track and the adjacent track. When thus located close to the track boundary, the head simultaneously reads the runout correction data from both the target track and the adjacent track.

Then, if different repeatable runout correction data have been written to the target track and the adjacent track, the repeatable runout correction data read from the target track is interfered with by the repeatable runout correction data read from the adjacent track. That is, crosstalk results from the inter-track interference. The crosstalk affects the read signal output by the head. Thus, if the read signal is demodulated, any of the relevant bits makes the demodulated value uncertain.

Thus, with the track pitch increasingly reduced, there has been a demand to prevent the interference of the repeatable runout correction data written to the adjacent track. There has also been a demand to maximally prevent a reduction in the size of each data area (that is, a reduction in track format efficiency) resulting from the write of the repeatable runout correction data to each track.

DETAILED DESCRIPTION

In general, according to one embodiment, a magnetic disk drive comprises a magnetic disk, a detector, a converter and a correction module. The magnetic disk comprises a plurality of substantially concentric tracks and is rotated by a spindle motor. Each of the plurality of tracks comprises a plurality of servo frames with servo burst data and repeatable runout correction data written thereto. The repeatable runout correction data is used to correct an repeatable error in the servo burst data synchronizing with rotation of the magnetic disk, comprises a pattern repeated at a predetermined period, and is written so that beginning of write is delayed by a time corresponding to a correction amount with respect to a base point corresponding to a synchronization timing position in the servo frame. The detector is configured to detect a phase delay amount corresponding to a time elapsed until the repeated pattern is read from the servo frame by a magnetic head, with respect to the synchronization timing position. The converter is configured to convert the detected phase delay amount into a correction amount corresponding to the phase delay amount. The correction module is configured to correct, based on the correction amount resulting from the conversion, a demodulated value of servo burst data read from the servo frame by the magnetic head.

Figure 1:
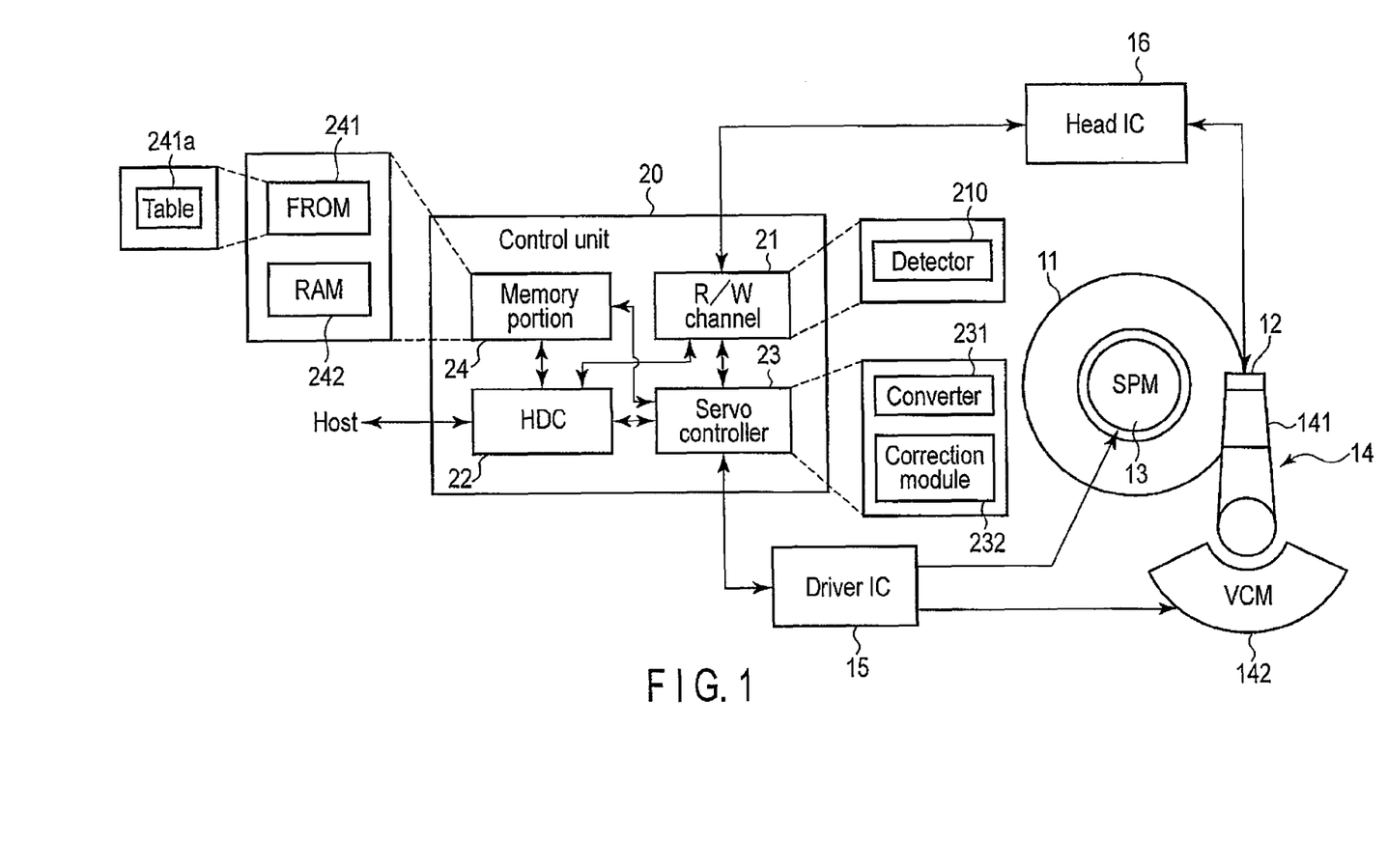
FIG. 1 is a block diagram showing an exemplary configuration of a magnetic disk drive according to an embodiment.

FIG. 1 is a block diagram showing an exemplary configuration of a magnetic disk drive according to an embodiment. The magnetic disk drive shown in FIG. 1 comprises a disk (magnetic disk) 11, a head (magnetic head) 12, a spindle motor (SPM) 13, an actuator 14, a driver IC 15, a head IC 16, and a control unit 20.

The disk 11 is a magnetic recording medium. The disk 11 comprises two disk surfaces, an upper surface and a lower surface. For example, the upper disk surface of the disk 11 forms a recording surface on which data is magnetically recorded. The head 12 is arranged in association with the recording surface of the disk 11. The head 12 comprises a write element (W) 121 (see FIG. 2 and FIG. 7) and a read element (R) 122 (see FIG. 2 to FIG. 4 and FIG. 7). The head 12 is used to read data written to the disk 11 (that is, reads data from the disk 11) and to write data to the disk.

In the configuration in FIG. 1, the magnetic disk drive is assumed to comprise the single disk 11. However, the magnetic disk drive may comprise a plurality of stacked disks 11. Furthermore, in the configuration in FIG. 1, one of the surfaces of the disk 11 forms a recording surface. However, both surfaces of the disk 11 may form recoding surfaces with two heads arranged in association with the respective recording surfaces.

The disk 11 is rotated at high speed by an SPM 13. The SPM 13 is driven by a driving current (or a driving voltage) supplied by the driver IC 15. The head 12 is attached to the tip of an arm 141 of the actuator 14. When the disk 11 rotates at high speed, the head 12 flies over the disk 11. The actuator 14 comprises a voice coil motor (VCM) 142 serving as a driving source for the actuator 14. When the actuator 14 is driven by the VCM 142, the head 12 moves in a circular arc over the disk 11 in the radial direction of the disk 11.

The driver IC 15 drives the SPM 13 and the VCM 142 under the control of the control unit 20 (more specifically, a servo controller 23 provided in the control unit 20 and described below). The head IC 16 is also referred to as a head amplifier and amplifies signals read by the head 12 (that is, read signals). The head IC 16 converts write data output by the control unit 20 (more specifically, an R/W channel 21 provided in the control unit 20 and described below) into a write current, and outputs the write current to the head 12.

The control unit 20 is implemented by, for example, a system LSI with a plurality of elements integrated together on one chip and including a microprocessor unit (MPU) and a memory. The control unit 20 comprises a read/write (R/W) channel 21, a disk controller (hereinafter referred to as HDC) 22, a servo controller 23, and a memory portion 24.

The R/W channel 21 processes signals for read and write. That is, the R/W channel 21 converts a read signal amplified by the head IC 16 into digital data, and decodes read data from the digital data. The R/W channel 21 also extracts servo data from the digital data. The R/W channel 21 also encodes write data transferred by the HDC 22, and transfers the encoded write data to the head IC 16. The R/W channel 21 comprises a detector 210. The functions of the detector 210 will be described below.

HDC 22 is connected to a host (host device) via a host interface. The host uses the magnetic disk drive shown in FIG. 1 as a storage device for the host. The host and the magnetic disk drive shown in FIG. 1 are provided in an electronic device such as a personal computer, a video camera, a music player, a portable terminal, a cellular phone, or a printer.

HDC 22 functions as a host controller that transmits and receives signals between the HDC 22 and the host. Specifically, the HDC 22 receives commands (such as a write command and a read command) transferred by the host. The HDC 22 also controls the data transfer between the host and the HDC 22. The HDC 22 also functions as a disk interface controller that controls data writes to the disk 11 and data reads from the disk 11 via the R/W channel 21, the head IC 16, and the head 12.

The servo controller 23 controls the SPM 13 and the VCM 142 via the driver IC 15. In particular, the servo controller 23 controls the VCM 142 via the driver IC 15 in order to position the head 12 at the target position of the target track on the disk 11. The servo controller 23 comprises a converter 231 and a correction module 232. The functions of the converter 231 and the correction module 232 will be described below.

The memory portion 24 comprises a flash ROM (FROM) 241 and RAM 242. FROM 241 is a rewritable nonvolatile memory. A table 241a is pre-stored in FROM 241. The data structure of the table 241a will be described below. At least a part of a storage area in RAM 242 is used as a work area for the HDC 22 and the servo controller 23.

Figure 2:
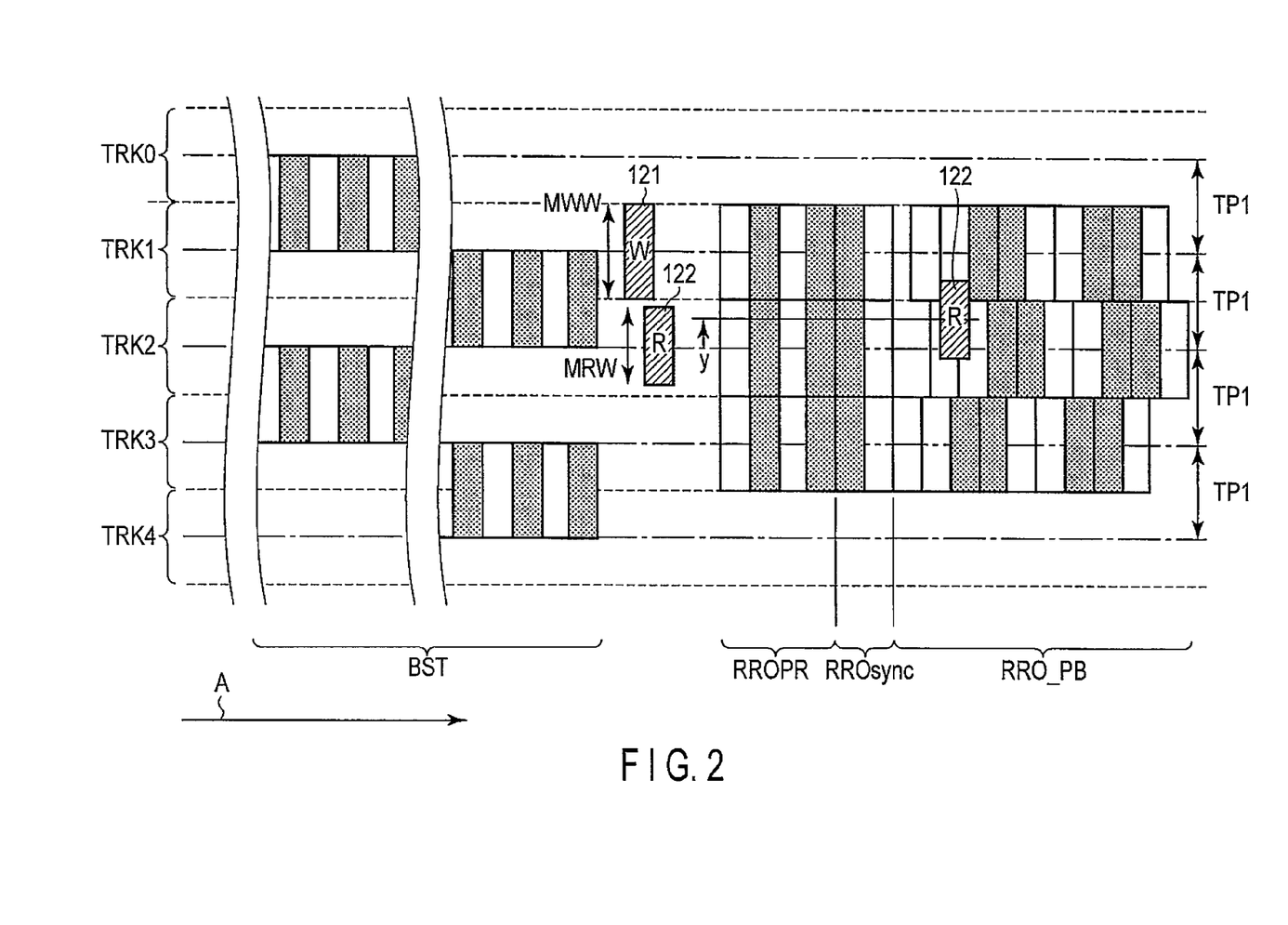
FIG. 2 is a schematic diagram showing an exemplary format of servo frames applied in the embodiment.

FIG. 2 is a schematic diagram showing an exemplary format of servo frames applied in the embodiment. In FIG. 2, arrow A denotes the circumferential direction of a plurality of concentric tracks TRK0, TRK1, TRK2, ... formed on the disk 11 (that is, the circumferential direction of the disk 11). In FIG. 2, a direction perpendicular to arrow A corresponds to the radial direction of the disk 11.

In the embodiment, track TRKi (i=0, 1, 2, ... ) is what is called a servo track comprising servo frames discretely arranged at predetermined intervals. In FIG. 2, track TRKi (i=0, 1, 2, ... ) is expressed as a straight line for convenience of drawing (that is, track TRKi is schematically expressed). The distance between the center line of track TRKi and the center line of track TRKi+1, that is, the track pitch, is denoted by TP1.

Each servo frame in track TRKi comprises areas BST, RROPR, RROsync, and RRO_PB. Area BST has servo burst data BST written thereto. The servo burst data BST is a part of servo data pre-written to the servo frame, for example, by a servo writer. The servo frame also comprises areas PRE, SM, and ADR, which are not shown in FIG. 2 (for these areas, see FIG. 5 and FIG. 6). Areas PRE, SM, and ADR have preamble data (servo preamble pattern) PRE, a servo mark SM, and address data (more specifically, address data including a servo sector address and a cylinder address) ADR written thereto, respectively.

The servo burst data BST is data used to detect displacement (position error) of the head 12 from, for example, the center line of track TRKi (the servo burst data BST is what is called relative position data), and is formed of a pattern repeated at a predetermined period. In the embodiment, the servo burst data is written so as to straddle the adjacent tracks TRKi and TRKi+1 in a staggered manner as shown in FIG. 2.

The servo burst data BST (that is, the servo burst data BST written to the area BST of each servo frame BST in track TRKi) includes errors caused by deviation of track TRKi from a perfect circle. The distortion results from runout (repeatable runout) synchronizing with rotation of the disk 11 during servo data write.

Thus, areas RROPR, RROsync, and RRO_PB of each servo frame in track TRKi are used to write a signal pattern forming repeatable runout (hereinafter referred to as RRO) correction data. The RRO correction data is a type of additional data added to the servo data. The RRO correction data is used to correct errors in the corresponding servo data (more specifically, the servo burst data included in the corresponding servo data) caused by RRO (that is, to correct the deviation of track TRKi from a perfect circle). This correction is referred to as perfect-circle correction.

To allow the head 12 to write and read data, the control unit 20 demodulates servo data including the servo burst data BST. The control unit 20 further converts the demodulated servo data (more specifically, the servo burst data in the demodulated servo data) into new servo data subjected to perfect-circle correction based on the subsequently read RRO correction data. The control unit 20 positions the head 12 at the target position based on the new servo data.

The data written to area RRO_PB is a pattern repeated at a predetermined interval and forms a part (main part) of the RRO correction data. The pattern repeated at the predetermined period is referred to as an RRO correction phase burst pattern RRO_PB. In the example illustrated in FIG. 2, the RRO correction phase burst pattern RRO_PB is shown as sequences of rectangles contiguously arranged in the direction of arrow A. Four contiguous rectangles form one period. One rectangle indicates a quarter period of the RRO correction phase burst pattern RRO_PB, that is, a phase of 90 degrees.

The data written to areas RROPR and RROsync are RRO preamble pattern RROPR and a synchronous pattern RROsync, and form another part of the RRO correction data. The RRO preamble pattern RROPR and the synchronous pattern RROsync are used to detect a read start timing for the RRO correction phase burst pattern RRO_PB (that is, the pattern repeated at the predetermined interval) written to the succeeding area RRO_PB. The RRO correction phase burst pattern RRO_PB is written such that the beginning of the write is delayed by a time corresponding to a correction amount with respect to a base point corresponding to the position (synchronization timing position) of a read start timing indicated by the preceding RRO preamble pattern RROPR and synchronous pattern RROsync in the corresponding servo frame. The synchronization timing position corresponds to the terminal of the synchronous pattern RROsync. In the description below, the RRO correction phase burst pattern RRO_PB is sometimes referred to as RRO correction data. In FIG. 2, the RRO preamble pattern RROPR, synchronous pattern RROsync, RRO correction phase burst pattern RRO_PB, and the like written on each of track TRK0 and TRK4 are omitted.

Now, the conventional art will be described. In the conventional art, digital data obtained by encoding the correction amount (this data is referred to as an RRO correction code RROCode) is used as information succeeding the RRO preamble pattern RROPR and synchronous pattern RROsync. The RRO correction code RROCode forms the main part of the RRO correction data. The RRO correction data is written to each track TRKi. Thus, the width over which the RRO correction data is written (the radial width of the disk 11) is equal to the width (write element width) MWW of the write element (W) 121 of the head.

Here, the width of track TRKi (track width) is assumed to be equal to the write element width MWW. Furthermore, the track width MWW and the track pitch TP1 are assumed to be sufficiently large with respect to the width (read element width) MRW of the read element (R) 122 of the head 12 unlike in the example illustrated in FIG. 2 (embodiment). The track pitch TP1 is the distance between the center line of track TRKi and the center line of the adjacent track TRKi−1 (or TRKi+1).

In this state, it is assumed that the head 12 reads the RRO correction data from track TRK2. In this case, even if the head 12 is positioned at a position shifted from the center of track TRK2 by "y" in the radial direction of the disk 11, that is, even if a position error "y" occurs in the radial direction of the disk 11, the read element (R) 122 of the head 12 is prevented from erroneously reading the RRO correction data (more specifically, the RRO correction code RROCode in the RRO correction data) from the adjacent track (for example, track TRK1).

However, in the recent magnetic disk drives, the track pitch has been increasingly reduced in order to improve surface recording density. Thus, the track pitch TP1 is almost equal to the write element width MWW as shown in FIG. 2. In this situation, if the above-described position error "y" occurs, the read element (R) 122 of the head 12 approaches the adjacent track (in the example illustrated in FIG. 2, track TRK1). This makes the read element (R) 122 of the head 12 likely to erroneously read the RRO correction code RROCode from the adjacent track TRK1.

If the target track TRK1 and the adjacent track TRK2 have different RRO correction code RROCode written thereto, crosstalk occurs at the boundary between the target track TRK1 and the adjacent track TRK2 as a result of the inter-track interference. The crosstalk affects the read signal output by the read element (R) 122 of the head 12. Thus, if the read signal is demodulated, any of the relevant bits makes the demodulated value uncertain.

Thus, to prevent the interference of the RRO correction code RROCode written to the adjacent track, a servo frame configuration is provided in which the RRO correction codes RROCode (more specifically, RRO correction data including the RRO correction codes RROCode) in the adjacent tracks TRKi and track TRKi−1 are not adjacent to each other. In the servo frame configuration, the RRO correction data in track TRKi and the RRO correction data in track TRKi−1 are written at positions shifted from each other in the circumferential direction of the disk 11. That is, the RRO correction data is thinned out alternately between tracks TRKi and TRKi−1. Thus, for example, the RRO correction data is not written to the third servo frame on track TRKi−1, which is adjacent to the first servo frame on track TRKi with the RRO correction data written thereto, but is written to the fourth servo frame on track TRKi−1, which is adjacent to the second servo frame on track TRKi with no RRO correction data written thereto.

The RRO correction data written to the first servo frame is used to correct the servo data (servo burst data BST) written to a plurality of servo frames including the first servo frame and other servo frames with no RRO correction data written thereto. Similarly, the RRO correction data written to the fourth servo frame is used to correct the servo data written to a plurality of servo frames including the fourth servo frame and other servo frames with no RRO correction data written thereto. Thus, the first and fourth servo frames are longer than in the case where the RRO correction data is written to all the servo frames in tracks TRKi and TRKi−1. To avoid complicating the setting of a data format, the second and third servo frames are set to be equal, in length, to the first and fourth servo frames.

Thus, the data area (that is, the area between the servo frames) in each of tracks TRKi and TRKi−1 is shorter than in the case where the RRO correction data is written to all the servo frames in each of tracks TRKi and TRKi−1. This reduces the format efficiency of tracks TRKi and TRKi−1.

Figure 3:
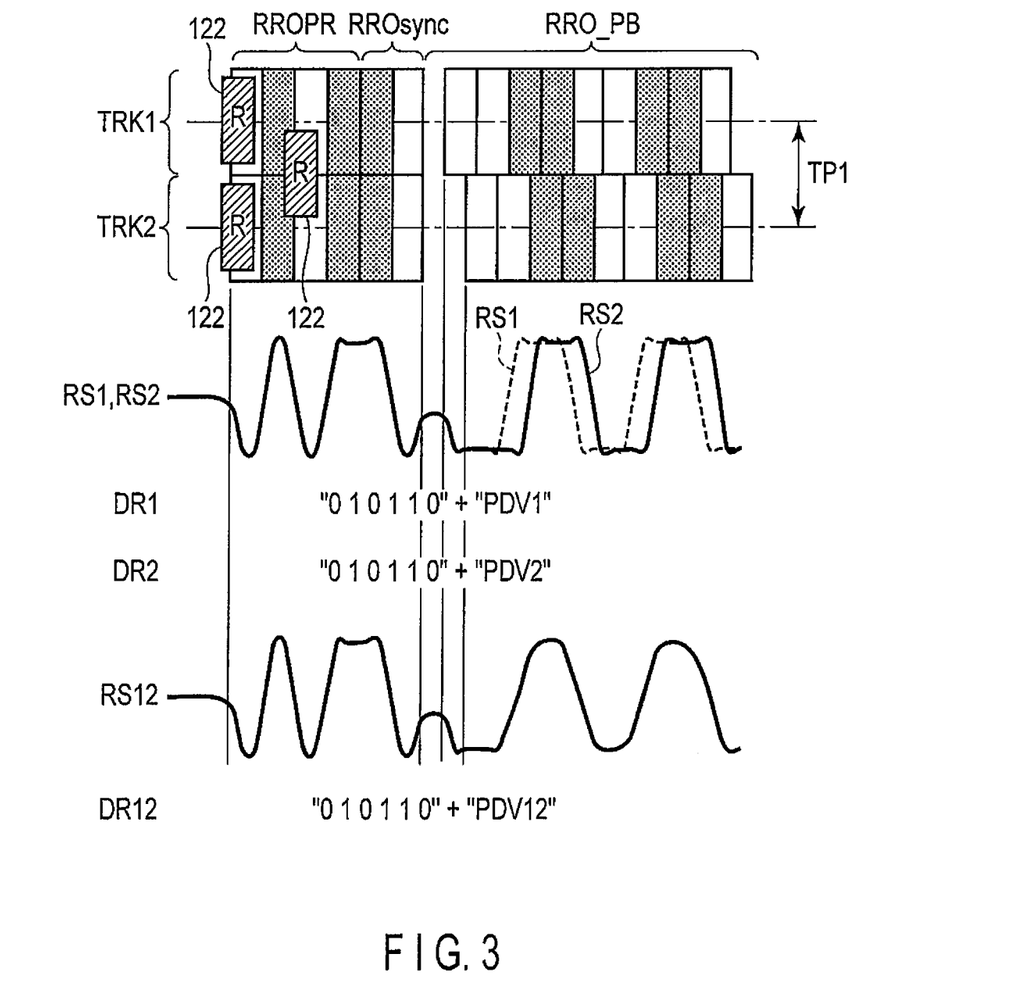
FIG. 3 is a diagram illustrating an example of read signals corresponding to repeatable runout (RRO) correction data and obtained when a read element of a head passes over the boundary between adjacent tracks, and an example of the results of demodulation of the read signals, according to the embodiment.

In contrast, the embodiment, the servo frame configuration shown in FIG. 2 serves to prevent the adverse effects of interference of the RRO correction data written to the adjacent track as well as a reduction in track format efficiency, as described below. FIG. 3 is a diagram illustrating read an example of signals corresponding to the RRO correction data and obtained when the read element (R) of the head 12 passes over the boundary between tracks TRK1 and TRK2, and an example of the results of demodulation of the read signals, according to the embodiment. That is, FIG. 3 shows a comparison of the format of servo frames in tracks TRK1 and TRK2, the waveforms of read signals corresponding to the RRO correction data located at the respective radial positions on the disk 11 over which the read element (R) 122 passes, and the results of demodulation of the read signals.

In FIG. 3, read signals RS1 and RS2 are obtained when the read element (R) 122, upon passing over the center line of each of tracks TRK1 and TRK2, reads the RRO correction data (more specifically, the RRO preamble pattern RROPR, the synchronous pattern RROsync, and the RRO correction phase burst pattern RRO_PB). A read signal RS12 is obtained when the read element (R) 122, upon passing over the boundary between tracks TRK1 and TRK2, reads the RRO correction data.

Demodulation results DR1 and DR2 for the read signals RS1 and RS2 comprise a demodulated value (here, 010110) corresponding to the RRO preamble pattern RROPR+synchronous pattern RROsync and phase demodulated values PDV1 and PDV2, respectively, corresponding to the RRO correction phase burst pattern RRO_PB. Each of the phase demodulated values PDV1 and PDV2 is indicative of the delay time (more specifically, the phase delay amount corresponding to the delay time) corresponding to the amount by which the write start position of the corresponding RRO correction phase burst pattern RRO_PB is lagged with respect to base point corresponding to the synchronous timing position indicated by the RRO preamble pattern RROPR and synchronous pattern RROsync preceding the RRO correction phase burst pattern RRO_PB. The phase delay amount is indicative of a correction amount (RRO correction amount) required to correct (eliminate) errors caused by RRO of the servo data with the pattern RRO_PB added thereto.

On the other hand, a demodulation result DR12 for the read signal RS12 comprises a demodulated value (here, 010110) corresponding to the RRO preamble pattern RROPR+synchronous pattern RROsync and a phase demodulated value PDV12 corresponding to the RRO correction phase burst pattern RRO_PB. As is apparent from FIG. 3, when the read element (R) 122 is positioned at the boundary between tracks TRK1 and TRK2, the read signal for the RRO correction data output by the read element (R) 122 (that is, the read signal RS12 corresponding to the RRO correction phase burst pattern RRO_PB read from area RRO_PB) is interfered with by the adjacent track.

However, in the embodiment, the RRO correction phase burst patterns RRO_PB written to areas RRO_PB in tracks TRK1 and TRK2, that is, the adjacent RRO correction phase burst patterns RRO_PB, are each a pattern repeated at a predetermined period (that is, a repeated pattern with the same frequency). Thus, the above-described RRO correction phase burst patterns RRO_PB, unlike the RRO correction codes RROCode applied in the conventional art, are not directly indicative of the correction amount (that is, the correction amount required to correct errors in the servo data with the RRO correction phase burst patterns RRO_PB added thereto which errors are caused by RRO).

The RRO correction phase burst patterns RRO_PB differ in the write start position thereof. That is, the RRO correction phase burst patterns RRO_PB are written such that the write start positions thereof are delayed by respective times (phases) corresponding to correction amounts, with respect to the base point corresponding to the synchronization timing position indicated by the RRO preamble pattern RROPR and synchronous pattern RROsync preceding the RRO correction phase burst patterns RRO_PB. Thus, unlike the read signal for the RRO correction code RROCode applied in the conventional art, the read signals RS1 and RS2 for the RRO correction phase burst patterns RRO_PB are correlated with each other. Furthermore, when the delay amounts of the write start positions of the RRO correction phase burst patterns RRO_PB with respect to the synchronization timing position are detected, the correction amounts can be obtained based on the phase delay amounts.

As described above, the read signals RS1 and RS2 are correlated with each other. Thus, if the read element (R) is positioned at the boundary between tracks TRK1 and TRK2, the read signal RS12 is output as a weighted average waveform highly correlated with each of tracks TRK1 and TRK2, as shown in FIG. 3. A phase demodulated value PDV12 corresponding to the read signal RS12 is also an average value conforming to the weighted average waveform. Thus, the correction amount indicated by the phase demodulated value PDV12 is unlikely to deviate significantly from the true value.

Now, the phase delay amount (delay time) will be described. First, it is assumed that the phase difference (the phase difference corresponding to the difference in delay time) in the write start position of the RRO correction phase burst pattern RRO_PB between the adjacent tracks TRK1 and TRK2, that is, the phase difference between the read signals RS1 and RS2, is greater than 90 degrees.

Figure 4:
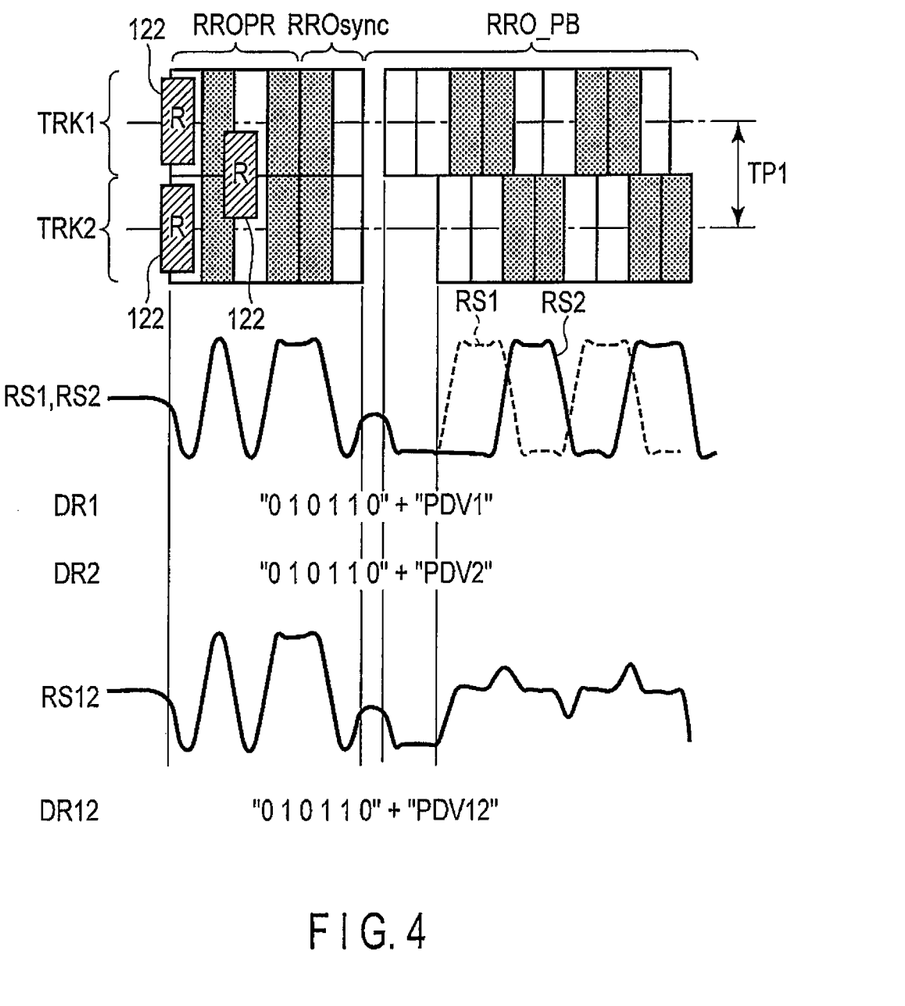
FIG. 4 is a diagram illustrating an example of read signals corresponding to RRO correction data and obtained when the read element of the head passes over the boundary between adjacent tracks if the phase difference of the read signal between the adjacent tracks is greater than 90 degrees, and an example of the results of demodulation of the read signals, according to the embodiment.

FIG. 4 is a diagram illustrating an example of read signals corresponding to RRO correction data and obtained when the read element (R) 122 of the head 12 passes over the boundary between adjacent tracks TRK1 and TRK2 if the phase difference is greater than 90 degrees, and an example of the results of demodulation of the read signals. If the phase difference between the read signals RS1 and RS2 from areas RRO_PB in tracks TRK1 and TRK2 is greater than 90 degrees, then at the boundary between tracks TRK1 and TRK2, crosstalk resulting from inter-track interference reduces the amplitude of the read signal RS12. In this case, the read signal RS12 in the example illustrated in FIG. 4 may fail to provide a signal amplitude sufficient to obtain a phase delay amount.

Thus, in the embodiment, when the RRO correction data is modulated into phase data, the resultant phase is set as the range of the phase is between zero degrees to 90 degrees with respect to the period of the RRO correction phase burst pattern (repeated pattern) RRO_PB. In this case, the phase corresponding to the minimum correction amount is zero degrees. The phase corresponding to the maximum correction amount is 90 degrees.

Thus, the RRO correction phase burst pattern corresponding to the minimum correction amount is written such that the write starts at the synchronization timing position in the corresponding servo frame. On the other hand, the RRO correction phase burst pattern corresponding to the maximum correction amount is written such that the write starts at a position lagging, by 90 degrees, the synchronization timing position in the corresponding servo frame (that is, the start position is obtained by delaying the write by the time corresponding to a phase of 90 degrees).

A table 241a stored in FROM 241 holds a correction amount corresponding to the phase (or delay time), for each predetermined phase (or delay time) within the range from a phase of zero degrees to a phase of 90 degrees (or within the delay time corresponding to the range from a phase of zero degrees to a phase of 90 degrees); for example, the correction amount is proportional to the phase (or delay time). Here, if a first phase and a second phase corresponding to the minimum correction amount and the maximum correction amount are denoted by α and β, respectively, then in the embodiment, α is zero degrees and β is 90 degrees. Alternatively, the phases may be such that α and β satisfy zero degrees<α<β<90 degrees.

Figure 5:
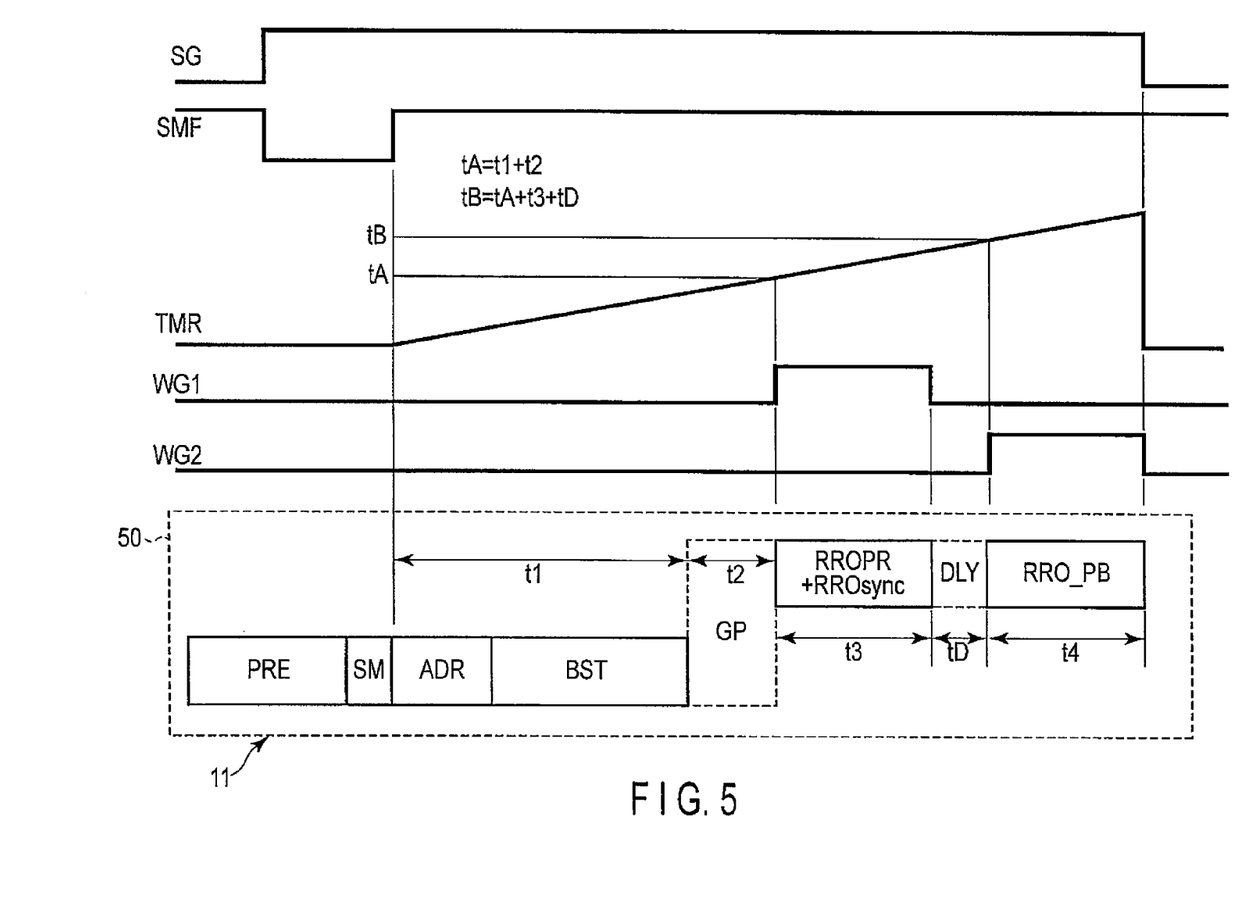
FIG. 5 is an exemplary timing chart illustrating write of RRO correction data according to the embodiment.

Now, write of the RRO correction data according to the embodiment will be described with reference to a timing chart in FIG. 5. In the embodiment, areas PRE, SM, and ADR of each servo frame have preamble data (servo preamble pattern PRE), a servo mark SM, and address data (address data including a servo sector address and a cylinder address) ADR pre-written thereto, respectively. It is assumed that an RRO preamble pattern RROPR, a synchronous pattern RROsync, and an RRO correction phase burst pattern RRO_PB are written to a servo frame 50 on the disk 11 shown in FIG. 5 to which the servo preamble pattern PRE, the servo mark SM, and the address data are written in the above-described manner.

The R/W channel 21 asserts a servo gate SG at a timing when the read element 122 of the head 12 reads the servo preamble pattern PRE from the servo frame 50 on the disk 11. At the same time, the R/W channel 21 negates a servo mark detection signal SMF. Then, when the servo mark SM succeeding the servo preamble pattern PRE is detected in the servo frame 50, the R/W channel 21 asserts the servo mark detection signal SMF to start a timer. Thus, the timer starts measuring time.

Upon detecting the elapse of a time tA from the value (timer value) TMR of the timer, the R/W channel 21 asserts write gate WG1. The time tA is the sum of a head passage time t1 and a head passage time t2 (tA=t1+t2). The head passage time t1 corresponds to the sum of expected lengths of the address data ADR and servo burst data BST written to the servo frame 50 on the disk 11. The head passage time t2 corresponds to a gap GP between the write element 121 and read element 122 of the head 12.

Upon asserting write gate WG1, the R/W channel 21 allows the write element 121 of the head 12 to write an RRO correction synchronous pattern (RROPR+RROsync) to the servo frame 50 on the disk 11 for a head passage time t3 corresponding to the length of the RRO correction synchronous pattern. Subsequently, when a delay time tD corresponding to an RRO correction amount elapses, the timer detects the elapse of a time tB. The time tB is the sum of the times tA, t3, and tD (tB=tA+t3+tD).

Then, the R/W channel 21 asserts write gate WG2. That is, the R/W channel 21 asserts write gate WG2 when the timer value TMR equals tB. The R/W channel 21 then allows the write element 121 of the head 12 to write the RRO correction phase burst pattern RRO_PB to the servo frame 50 on the disk 11. The above-described operation allows RRO correction data including the RRO correction phase burst pattern RRO_PB to be written to the servo frame 50 on the disk 11.

Figure 6:
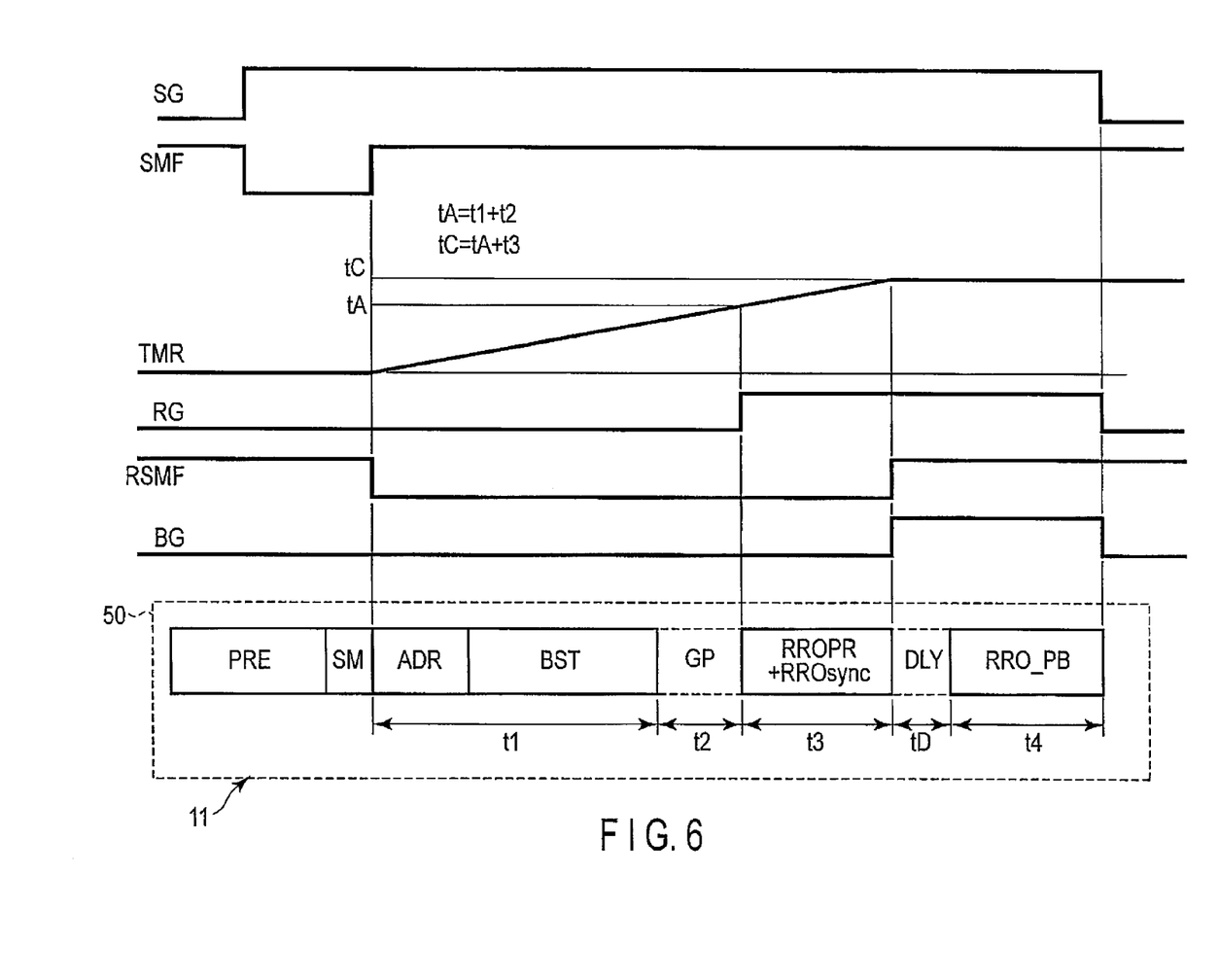
FIG. 6 is an exemplary timing chart illustrating read of RRO correction data according to the embodiment.

Now, read of RRO correction data according to the embodiment will be described with reference to a timing chart in FIG. 6. When the servo mark SM is detected in the servo frame 50 on the disk 11, the R/W channel 21 asserts the servo mark detection signal SMF to start the timer as is the case with the write of RRO correction data. Thus, the timer starts measuring time.

Then, the R/W channel 21 allows the read element 122 to read the address data ADR and servo burst data BST succeeding the servo mark SM. The R/W channel 21 demodulates the read address data ADR and servo burst data BST, and stores a servo demodulated value corresponding to the result of the demodulation in a first register.

Upon detecting the elapse of the time tA, the sum of the head passage time t1 and the head passage time t2, from the value (timer value) TMR of the timer, the R/W channel 21 asserts a read gate RG. As is the case with the write of RRO correction data, the head passage time t1 corresponds to the sum of expected lengths of the address data ADR and servo burst data BST. The head passage time t2 corresponds to the gap GP between the write element 121 and read element 122 of the head 12.

Upon asserting the read gate RG, the R/W channel 21 allows the read element 122 of the head 12 to read the RRO correction synchronous pattern (RROPR+RROsync). Then, upon detecting the synchronous pattern RROsync through read of the RRO correction synchronous pattern, that is, detecting the synchronization timing position, the R/W channel 21 stores the current value (timer value) tC of the timer TMR in a second register. tC denotes the sum of the time tA and the time t3. The time t3 is from the assertion of the read gate RG to the detection of the synchronous pattern RROsync.

The R/W channel 21 asserts a burst gate BG simultaneously with the detection of the synchronization timing position. Thus, the read element 122 of the head 12 reads the RRO correction phase burst pattern RRO_PB succeeding the synchronous pattern RROsync. The detector 210 of the R/W channel 21 demodulates the read signal for the RRO correction phase burst pattern RRO_PB into phase data by discrete Fourier transformation (DFT). The phase data is indicative of a phase delay amount DLY corresponding to a time tD elapsed until the RRO correction phase burst pattern RRO_PB is read by the read element 122 of the head 12, with respect to the base point corresponding to the synchronization timing position (this phase delay amount is hereinafter referred to as the phase delay amount tD). That is, the detector 210 performs discrete Fourier transformation on the read signal for the RRO correction phase burst pattern RRO_PB to detect the phase delay amount (phase demodulated value) tD as phase data for a predetermined frequency. The detector 210 stores the detected phase delay amount tD in a third register.

The converter 231 of the servo controller 23 converts the phase delay amount tD stored in the third register, into a correction amount (RRO correction amount) based on the table 241a. A correction module 232 of the servo controller 23 corrects, based on the RRO correction amount, the servo demodulated value stored in the first register (particularly the demodulated value of the servo burst data BST). Thus, an error caused by RRO can be eliminated from the servo demodulated value. This is equivalent to removal (correction) of an error in the servo burst data BST caused by RRO. The servo controller 23 controls the VCM 142 via the driver IC 15 based on the servo demodulated value from which the error caused by RRO has been eliminated, to position the head 12 at the target position. This prevents at least the displacement of the head caused by RRO.

As described above, in the embodiment, the RRO correction data comprising the RRO correction phase burst pattern RRO_PB (that is, the pattern repeated at the predetermined period) is written to each of the plurality of servo frames on track TRKi (i=0, 1, 2, . . . ) so that for each servo frame, the write start position is lagged by the phase (time) corresponding to the RRO correction amount with respect to the base point corresponding to the synchronization timing position in the servo frame. Thus, even if the read signal from the target track is likely to be interfered with by the RRO correction data written to the adjacent track as a result of the reduced width of each track, the embodiment can exert the following effects. That is, data including the RRO correction data can be obtained without making the demodulated value uncertain. That is, the embodiment can prevent the adverse effects of the interference of the RRO correction data written to the adjacent track. Furthermore, the embodiment can prevent a possible increase the size of the RRO correction data. That is, a possible increase in the size of each servo frame can be prevented. Thus, the embodiment can prevent a reduction in the size of the area between the servo frames (that is, the data area), thus maximally preventing a reduction in track format efficiency.

<Modification>

Now, a modification of the embodiment will be described. In the embodiment, the phase delay amount detected by performing discrete Fourier transformation on the read signal for the RRO correction phase burst pattern RRO_PB is used as an absolute value (that is, the absolute phase delay amount). However, the phase delay amount detected, if the read signal output by the head 12 contains noise resulting from write of the RRO correction phase burst pattern RRO_PB, is not necessarily an accurate value. Thus, the modification is characterized by detecting a more accurate phase delay amount.

Figure 7:
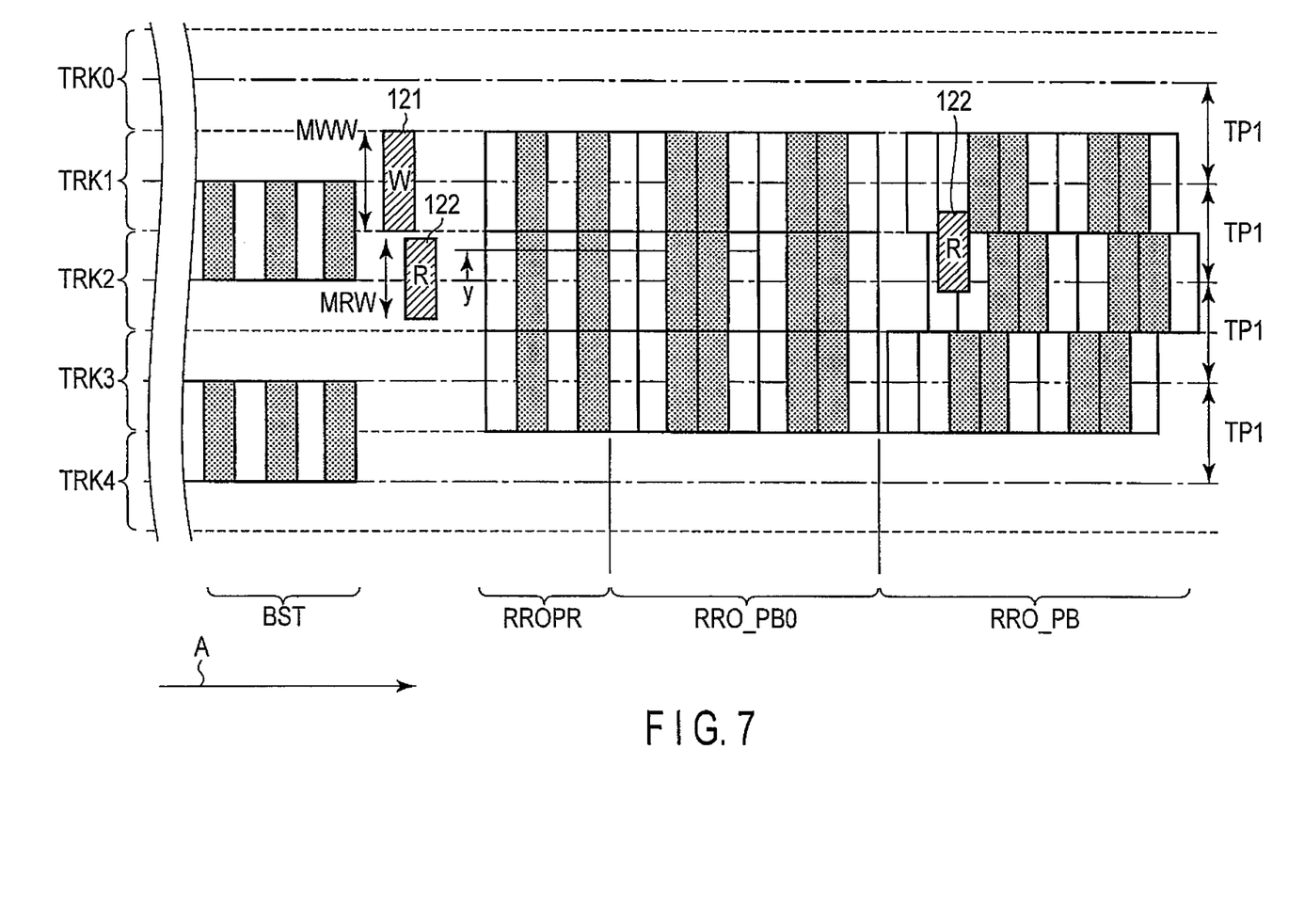
FIG. 7 is a schematic diagram showing an exemplary format of servo frames applied in a modification of the embodiment.

FIG. 7 is a schematic diagram showing a format of servo frames applied in the modification. In FIG. 7, components equivalent to those in FIG. 2 are denoted by the same reference numerals. The format of the servo frame applied in the modification is different from that applied in the embodiment. The difference lies in that a zero phase pattern RRO_PB0 is provided instead of the synchronous pattern RROsync.

The zero phase pattern RRO_PB0 is written to each servo frame, for example, so as to be contiguous with the RRO preamble pattern RROPR. The zero phase pattern RRO_PB0 is a repeated pattern with the same period as that of the succeeding RRO correction phase burst pattern RRO_PB. The zero phase pattern RRO_PB0 is used to indicate a phase of zero degrees corresponding to the base point for the succeeding RRO correction phase burst pattern RRO_PB. That is, whereas the synchronous pattern RROsync applied in the embodiment is indicative of the synchronization timing position, the zero phase pattern RRO_PB0 is indicative of the position of a phase of zero degrees, which replaces the synchronization timing position. Thus, the RRO correction phase burst pattern RRO_PB is written such that the beginning of the write is delayed by the time (phase) corresponding to the correction amount with respect to the base point corresponding to the terminal of the preceding zero phase pattern RRO_PB0.

The detector 210 of the R/W channel 21 performs discrete Fourier transformation on the read signal for the zero phase pattern RRO_PB0 and the read signal for the RRO correction phase burst pattern RRO_PB to obtain a first phase demodulated value and a second phase demodulated value. In the modification, the first and second phase demodulated values are used as relative values (that is, the relative phase delay amounts). Thus, the detector 210 subtracts the first phase demodulated value (that is, the phase demodulated value of the zero phase pattern RRO_PB0 corresponding to the base point) from the second phase demodulated value to calculate a phase demodulated value (phase delay amount) as an absolute value. Namely, the detector 210 detects the absolute phase delay amount corresponding to the RRO correction amount.

If the read signal output by the head 12 contains noise caused by pattern write and emerging as a definitive characteristic as a result of an individual variation in the head or medium, the first and second phase demodulated values are affected by almost the same amount of noise. However, the adverse effects of the noise can be eliminated by subtracting the first phase demodulated value from the second demodulated value. Thus, the modification provides a more accurate phase demodulated value than the embodiment.

Figure 8:
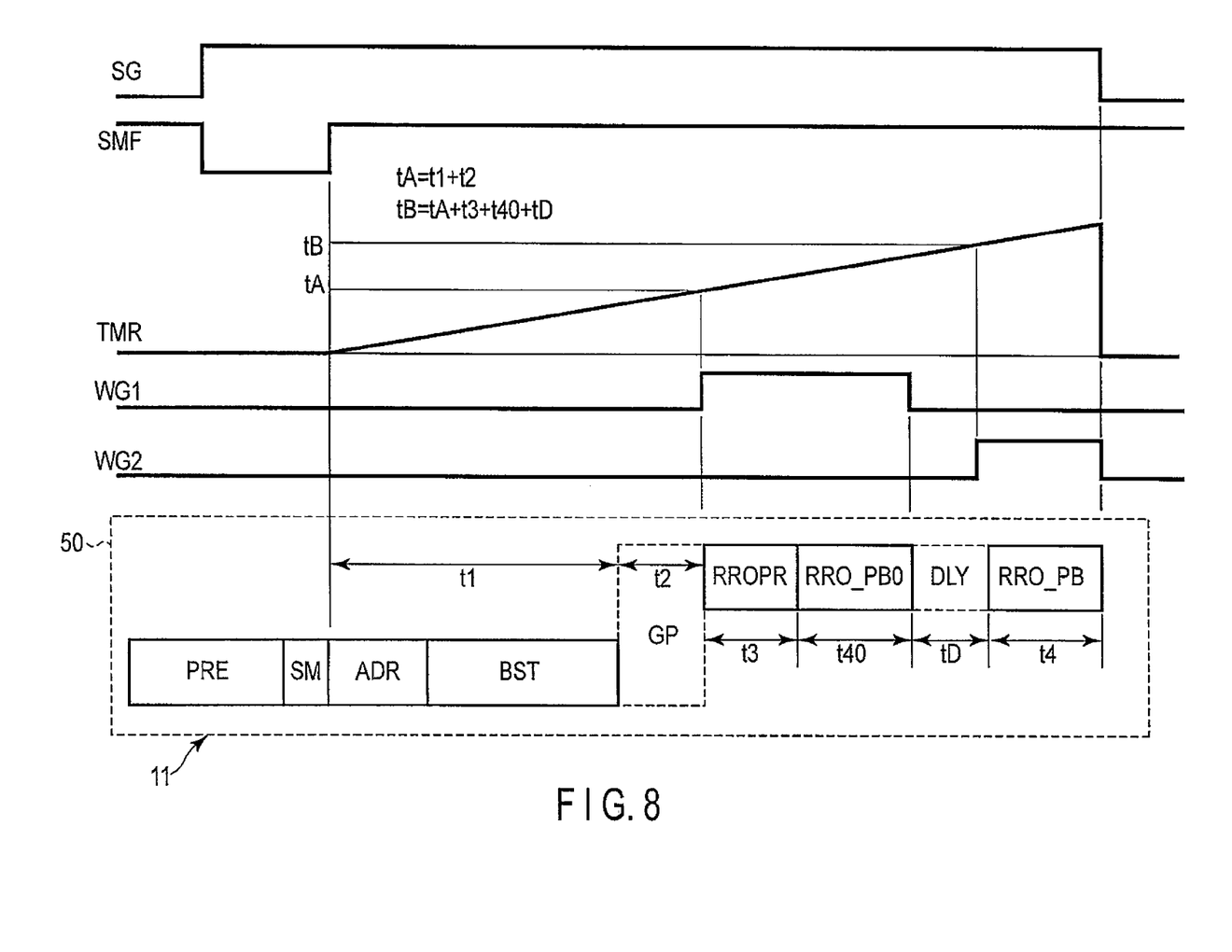
FIG. 8 is an exemplary timing chart illustrating write of RRO correction data according to the modification of the embodiment.

Now, write of RRO correction data according to the modification will be described with reference to a timing chart in FIG. 8, by focusing on differences from the embodiment. Upon detecting the servo mark SM succeeding the servo preamble pattern PRE in the servo frame 50 on the disk 11, the R/W channel 21 asserts the servo mark detection signal SMF to start the timer.

Upon detecting the elapse of the time tA (tA=t1+t2) from the timer value TMR, the R/W channel 21 asserts write gate WG1. Then, the R/W channel 21 allows the write element 121 of the head 12 to continuously write the RRO preamble pattern RROPR and the zero phase pattern RRO_PB0 to the servo frame 50 on the disk 11 for head passage times t3 and t40 corresponding to the lengths of the RRO preamble pattern RROPR and the zero phase pattern RRO_PB0. Subsequently, when the delay time tD corresponding to the RRO correction amount elapses, the timer detects the elapse of the time tB corresponding to the sum of the times tA, t3, t40, and tD (tB=tA+t3+t40+tD).

Then, the R/W channel 21 asserts write gate WG2. The R/W channel 21 then allows the write element 121 of the head 12 to write the RRO correction phase burst pattern RRO_PB to the servo frame 50 on the disk 11. The above-described operation allows the RRO correction data including the RRO correction phase burst pattern RRO_PB to be written to the servo frame 50 on the disk 11. At least one of the embodiments can prevent the adverse effects of interference of the repeatable runout correction data written to the adjacent track as well as a reduction in track format efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
a magnetic disk comprising a plurality of substantially concentric tracks and which is rotated by a spindle motor, each of the plurality of tracks comprising a plurality of servo frames with servo burst data and repeatable runout correction data written thereto, wherein the repeatable runout correction data is used to correct an repeatable error in the servo burst data synchronizing with rotation of the magnetic disk, comprises a pattern repeated at a predetermined period, and is written so that beginning of write is delayed by a time corresponding to a correction amount with respect to a base point corresponding to a synchronization timing position in the servo frame;

a detector configured to detect a phase delay amount corresponding to a time elapsed until the repeated pattern is read from the servo frame by a magnetic head, with respect to the synchronization timing position;
a converter configured to convert the detected phase delay amount into a correction amount corresponding to the phase delay amount; and
a correction module configured to correct, based on the correction amount resulting from the conversion, a demodulated value of servo burst data read from the servo frame by the magnetic head.

2. The magnetic disk drive of claim 1, wherein the delay time is preset so as to fall within a range from a first time to a second time corresponding to a range from a first phase to a second phase included in a range from a phase of zero degrees to a phase of 90 degrees with respect to the predetermined period of the repeated pattern or to fall within the second time during which a phase difference of the repeated pattern is at most 90 degrees between adjacent tracks of the plurality of tracks.

3. The magnetic disk drive of claim 2, wherein the first phase corresponds to a minimum value of the correction amount, and the second phase corresponds to a maximum value of the correction amount.

4. The magnetic disk drive of claim 3, further comprising a table configured to associate the phase with the correction amount within the range from the first phase to the second phase,
wherein the converter is configured to convert the detected phase delay amount into the correction amount corresponding to the detected phase delay amount by referencing the table.

5. The magnetic disk drive of claim 1, wherein the detector is configured to detect the phase delay amount by performing discrete Fourier transformation on a read signal for the repeated pattern read by the magnetic head.

6. The magnetic disk drive of claim 5, wherein:
a zero phase pattern identical to the repeated pattern in period is written to each of the servo frames, and the zero phase pattern is used to indicate a position of a phase of zero degrees corresponding to a base point of the repeated pattern, instead of the synchronization timing position; and
the detector is configured to detect the phase delay amount by subtracting a first phase demodulated value from a second phase demodulated value, each of the first phase demodulated value and the second phase demodulated value being obtained by performing discrete Fourier transformation on a read signal for the zero phase pattern and a read signal for the repeated pattern.

7. A method for correcting servo burst data applied to a magnetic disk drive comprising a magnetic disk comprising a plurality of substantially concentric tracks and which is rotated by a spindle motor, each of the plurality of tracks comprising a plurality of servo frames with servo burst data and repeatable runout correction data written thereto, wherein the repeatable runout correction data is used to correct an repeatable error in the servo burst data synchronizing with rotation of the magnetic disk, comprises a pattern repeated at a predetermined period, and is written so that beginning of write is delayed by a time corresponding to a correction amount with respect to a base point corresponding to a synchronization timing position in the servo frame, the method comprising:
detecting a phase delay amount corresponding to a time elapsed until the repeated pattern is read from the servo frame by a magnetic head, with respect to the synchronization timing position;
converting the detected phase delay amount into a correction amount corresponding to the phase delay amount; and
correcting a demodulated value of servo burst data read from the servo frame by the magnetic head based on the correction amount resulting from the conversion.

8. The method of claim 7, wherein the delay time is preset so as to fall within a range from a first time to a second time corresponding to a range from a first phase to a second phase included in a range from a phase of zero degrees to a phase of 90 degrees with respect to the predetermined period of the repeated pattern or to fall within the second time during which a phase difference of the repeated pattern is at most 90 degrees between adjacent tracks of the plurality of tracks.

9. The method of claim 8, wherein the first phase corresponds to a minimum value of the correction amount, and the second phase corresponds to a maximum value of the correction amount.

10. The method of claim 9, wherein the detected phase delay amount is converted into the correction amount corresponding to the detected phase delay amount by referencing a table configured to associate the phase with the correction amount within the range from the first phase to the second phase.

11. The method of claim 7, wherein the phase delay amount is detected by performing discrete Fourier transformation on a read signal for the repeated pattern read by the magnetic head.

12. The method of claim 11, wherein:
a zero phase pattern identical to the repeated pattern in period is written to each of the servo frames, and the zero phase pattern is used to indicate a position of a phase of zero degrees corresponding to a base point of the repeated pattern, instead of the synchronization timing position; and
the method further comprises obtaining each of a first phase demodulated value and a second phase demodulated value by performing discrete Fourier transformation on a read signal for the zero phase pattern and a read signal for the repeated pattern; and
the phase delay amount is detected by subtracting the first phase demodulated value from the second phase demodulated value.

* * * * *